US009889751B2

(12) United States Patent
Jang et al.

(10) Patent No.: US 9,889,751 B2
(45) Date of Patent: Feb. 13, 2018

(54) BATTERY MANAGEMENT APPARATUS AND METHOD

(71) Applicant: LG CHEM, LTD., Seoul (KR)

(72) Inventors: Minchul Jang, Daejeon (KR); Dong Keun Kwon, Daejeon (KR); Min Seo Kim, Daejeon (KR); Yu Mi Kim, Daejeon (KR); Byoungkuk Son, Daejeon (KR); Da Young Sung, Daejeon (KR); Seong Ho Lee, Daejeon (KR); Gi Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/419,281

(22) PCT Filed: Jul. 30, 2014

(86) PCT No.: PCT/KR2014/006981
§ 371 (c)(1),
(2) Date: Feb. 3, 2015

(87) PCT Pub. No.: WO2015/016600
PCT Pub. Date: Feb. 5, 2015

(65) Prior Publication Data
US 2016/0046195 A1    Feb. 18, 2016

(30) Foreign Application Priority Data

Jul. 30, 2013   (KR) .................. 10-2013-0090125
Jul. 30, 2014   (KR) .................. 10-2014-0097062

(51) Int. Cl.
*H02J 7/00*   (2006.01)
*B60L 11/18*  (2006.01)
(Continued)

(52) U.S. Cl.
CPC ......... *B60L 11/1809* (2013.01); *B60L 3/0046* (2013.01); *B60L 3/12* (2013.01);
(Continued)

(58) Field of Classification Search
CPC ...... H02J 7/0003; H02J 7/0013; H02J 7/0024; H02J 7/0031; H02J 7/0032; B60L 11/1853; B60L 11/1868
(Continued)

(56) References Cited

U.S. PATENT DOCUMENTS

2005/0093508 A1*  5/2005  Taniguchi ............ H02J 7/1423
                                                    320/104
2010/0079108 A1*  4/2010  Monden ................ H02J 7/0026
                                                    320/116
(Continued)

FOREIGN PATENT DOCUMENTS

DE   10 2011 000 490 A1   3/2012
EP          1531536 A2    5/2005
(Continued)

OTHER PUBLICATIONS

Taiwan Office Action for Appl. No. 103126010 dated Sep. 21, 2015 (w/ English translation).
(Continued)

*Primary Examiner* — Drew A Dunn
*Assistant Examiner* — Michael DiBenedetto
(74) *Attorney, Agent, or Firm* — Birch, Stewart, Kolasch & Birch, LLP

(57) ABSTRACT

The present invention provides a battery management apparatus and method which connect a plurality of batteries having different energy densities to each other and control power supplied through the plurality of batteries to control the driving of the driving body.

17 Claims, 7 Drawing Sheets

(51) Int. Cl.
*H01M 10/42* (2006.01)
*H02J 7/04* (2006.01)
*H01M 10/44* (2006.01)
*H01M 10/46* (2006.01)
*B60L 3/00* (2006.01)
*B60L 3/12* (2006.01)

(52) U.S. Cl.
CPC ....... *B60L 11/1803* (2013.01); *B60L 11/1861* (2013.01); *B60L 11/1864* (2013.01); *B60L 11/1868* (2013.01); *H01M 10/4207* (2013.01); *H01M 10/441* (2013.01); *H01M 10/46* (2013.01); *H02J 7/0054* (2013.01); *H02J 7/0068* (2013.01); *H02J 7/04* (2013.01); *B60L 2240/545* (2013.01); *B60L 2240/547* (2013.01); *B60L 2240/549* (2013.01); *H01M 2010/4271* (2013.01); *H01M 2220/20* (2013.01); *Y02T 10/7011* (2013.01); *Y02T 10/7061* (2013.01)

(58) Field of Classification Search
USPC ........ 320/103, 104, 109, 116–120, 127, 128, 320/137, 121; 307/18, 19, 20, 21
See application file for complete search history.

(56) References Cited

U.S. PATENT DOCUMENTS

| | | | |
|---|---|---|---|
| 2012/0025744 A1* | 2/2012 | Kim | B60L 11/1853 318/139 |
| 2012/0074894 A1 | 3/2012 | Chen et al. | |
| 2012/0248869 A1 | 10/2012 | Itagaki et al. | |
| 2013/0264975 A1* | 10/2013 | Kaita | B60L 11/1853 318/139 |

FOREIGN PATENT DOCUMENTS

| | | |
|---|---|---|
| JP | 2004-336934 A | 11/2004 |
| JP | 2011-178384 A | 9/2011 |
| JP | 2012-70609 A | 4/2012 |
| JP | 2013-85413 A | 4/2012 |
| JP | 2012-186989 A | 9/2012 |
| JP | 2013-128354 A | 6/2013 |
| KR | 10-1097272 B1 | 12/2011 |

OTHER PUBLICATIONS

Korean Office Action dated May 1, 2015 for Appl. No. 10-2014-0097062 (w/ English translation).
Korean Office Action dated Nov. 2, 2015 for Appl. No. 10-2014-0097062 (w/ English translation).
English translation of Japanese Office Action for Appl. No. 2015-529713 dated Nov. 24, 2015.
Extended European Search Report, dated Mar. 17, 2016, for European Application No. 14831493.3.
Chinese Office Action dated Jul. 6, 2016 for Application No. 201480002190.9 with English translation.
European Patent Office, "Communication Pursuant to Article 94(3) EPC," issued in connection with European Patent Application No. 14 831 493.3, dated Aug. 28, 2017.

* cited by examiner

BATTERY MANAGEMENT APPARATUS AND METHOD

TECHNICAL FIELD

This application claims priority from Korean Patent Application Nos. 10-2013-0090125 and 10-2014-0097062 filed on Jul. 30, 2013, and Jul. 30, 2014, in the KIPO, the disclosure of which is incorporated herein by reference in its entirety.

The present invention relates to a battery management apparatus and method, and more particularly, to a battery management apparatus and method in which a plurality of batteries having different energy densities is connected to each other and power which is supplied through the plurality of batteries is controlled to control driving of a driving body.

BACKGROUND ART

Recently, as industries and economies have rapidly developed, the use of battery, which is also called a storage battery, is correspondingly increased together with the use of electricity which may allow such development.

Generally, a battery is also referred to as a storage battery or a secondary battery and refers to a storage device in which a chemical substance (for example, sulfuric acid) which is present in the battery is electrolyzed by a chemical action with two plates such as a copper plate and a zinc plate to generate electrical energy and the electrical energy is stored or output.

The battery includes a positive (+) electrode (anode) and a negative (−) electrode (cathode) and electric current flows into the battery through the positive electrode and flows out through the negative electrode.

In the meantime, such batteries may be connected in series by sequentially connecting the positive electrodes and the negative electrodes of a plurality of batteries so that the batteries have the same current value and may be connected in parallel by connecting the positive electrode to the positive electrode and the negative electrode to the negative electrode of the plurality of batteries so that the batteries have the same voltage value.

In this case, a state of charge of battery is determined to have a predetermined value so that the battery cannot be used unlimitedly. Therefore, the battery is used to be connected to an external power supply at ordinary times or is connected to a different type of battery to be charged so that a driving body such as a motor which is connected with the battery is smoothly driven.

However, in the case of a battery management apparatus of the related art, a maximum driving distance of a vehicle in which a lithium ion battery having a capacity of 24 kWh is applied is only 160 km. Further, even when a battery having 250 Wh/kg which is a maximum allowable energy density of the lithium ion battery is used, the maximum driving distance is only approximately 300 km. This does not reach 500 km which is the maximum driving distance of an internal combustion engine (ICE) vehicle, and thus energy efficiency is degraded.

Therefore, in order to solve the problems of the above-described battery management apparatus of the related art, the inventor has been made in an effort to provide a battery management apparatus and method which are capable of selectively controlling a battery which supplies power to a driving body according to various circumstances by using a plurality of batteries to exchange power while an overall size of the batteries is the same as the size of a battery of the related art.

DETAILED DESCRIPTION OF THE INVENTION

Technical Problem

The present invention has been made in an effort to provide a battery management apparatus and method in which a plurality of batteries having different energy densities is connected to each other and power which is supplied through the plurality of batteries is controlled to control driving of a driving body.

More specifically, the present invention provides a battery management apparatus and method which selectively control power which is supplied to a driving body by connecting the plurality of batteries having different energy densities to one or more driving bodies.

Further, the present invention provides a battery management apparatus and method in which a plurality of batteries supplements power to each other so that even when an output of any one of the batteries is lowered, the driving body is prevented from being erroneously operated by another battery.

Technical Solution

An exemplary embodiment provides a battery management apparatus, including: a first battery which is connected to a driving body which is supplied with power so as to be driven and supplies power to drive the driving body; a second battery which is connected to the first battery to supply power to charge the first battery or is connected to the driving body to supply power to drive the driving body; a control unit which controls an electric energy which is supplied between the first and second batteries in accordance with states of the first and second batteries; and a switch unit which is controlled by the control unit and connects the first and second batteries and the control unit with each other.

An energy density of the first battery may be lower than an energy density of the second battery.

The first battery may be one or more of a lithium ion (Li-ion) battery, a nickel-metal hydride (Ni-MH) battery, and a metal air battery.

A capacity of the second battery may be larger than a capacity of the first battery.

The second battery may be one or more of a lithium (Li) battery, a lithium sulfur (Li—S) battery, a metal air battery, and an all solid state battery.

When a state of charge of the first battery is equal to or lower than a predetermined state of charge, the control unit may control to supply power of the second battery so as to drive the driving body through the power of the second battery.

The switch unit may include first and second switch units which are connected in parallel to the driving body and the first and second switch units may be connected to the first and second batteries, respectively.

When a state of charge of the first battery is equal to or lower than a predetermined state of charge, the control unit may control power of the second battery so as to charge the first battery by the second battery.

The switch unit may include a first switch unit which is provided between the driving body and the first battery; and a second switch unit which is provided between the first and second batteries.

When an output amount of the second battery gets out of the predetermined allowable output range, the control unit may control to drive the driving body through the first battery.

The switch unit may include first and second switch units which are connected in parallel to the driving body and the first and second switch units may be connected to the second and first batteries, respectively.

Another exemplary embodiment of the present invention provides a battery management method, including: connecting a driving body which is supplied with power to be driven and a first battery which supplies the power to drive the driving body; supplying power to charge the first battery or connecting a second battery which supplies power to drive the driving body with the first battery or the driving body; and connecting a control unit which controls electric energy which is supplied between the first and second batteries according to states of the first and second batteries with the first and second batteries through a switch unit.

The battery management method may further include: calculating, by the control unit, a state of charge (SOC) of the first battery; and comparing, by the control unit, a predetermined state of charge with the state of charge of the first battery to control the power to be supplied to the driving body.

The controlling of the power to be supplied to the driving body may include: when a state of charge of the first battery is equal to or lower than a predetermined state of charge, controlling the switch unit so as to drive the driving body through the power of the second battery to supply the power of the second battery, by the control unit.

The controlling of supplying power of the second battery may include connecting first and second switch units, which are connected in parallel with to the driving body, with the first and second batteries, respectively.

The controlling of the power to be supplied to the driving body may include: controlling the power of the second battery so as to charge the first battery by the second battery when a state of charge of the first battery is equal to or lower than a predetermined state of charge. The controlling of power of the second battery may include providing a first switch unit between the driving body and the first battery to be connected to each other, and providing a second switch unit between the first battery and the second battery to be connected to each other.

The controlling of the power to be supplied to the driving body may include: controlling to supply power of the first battery so as to drive the driving body through the power of the first battery when an output amount of the second battery gets out of a predetermined allowable output range.

The controlling of supplying power of the first battery may include connecting first and second switch units, which are connected in parallel with the driving body, with the second and first batteries, respectively.

Advantageous Effects

According to the battery management apparatus and method of the present invention, a plurality of batteries having different energy densities is connected to each other so that when an output of an arbitrary battery is lowered, the plurality of batteries supplements the power to each other so that a driving body may be always normally driven.

Further, when the plurality of batteries is connected, a size of the overall batteries is the same as the size of a battery of the related art so that when the batteries are attached in an electric vehicle, the batteries are held in a battery receiving space of the related art so that the space may be efficiently utilized.

Further, a second battery having a high energy density and a high capacity is provided so that output efficiency is increased and thus the maximum driving distance of the electric vehicle is drastically increased.

BEST MODE

The present invention will be described in detail below with reference to the accompanying drawings. Herein, repeated description and the detailed description of a known function and configuration that may make the purpose of the present invention unnecessarily ambiguous will be omitted. Exemplary embodiments of the present invention are provided so that those skilled in the art may more completely understand the present invention. Accordingly, the shape, the size, etc., of elements in the figures may be exaggerated for explicit comprehension.

In the specification, unless explicitly described to the contrary, the word "comprise" and variations such as "comprises" or "comprising", will be understood to imply the inclusion of stated elements but not the exclusion of any other elements.

Figure 1:
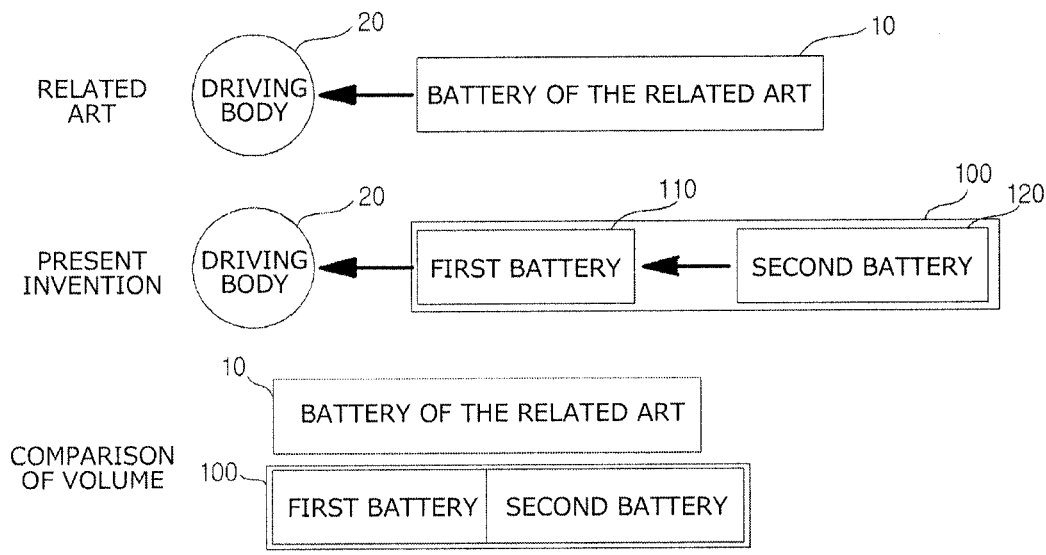
FIG. 1 is a view comparing a battery 10 of the related art with a battery management apparatus 100 according to an exemplary embodiment of the present invention.

FIG. 1 is a view comparing a battery 10 of the related art with a battery management apparatus 100 according to an exemplary embodiment of the present invention.

Referring to FIG. 1, according to a battery 10 of the related art, a single battery 10 is connected to a driving body 20. In this case, when an output of the battery 10 of the related art is lowered, since a device which supplies power to the battery 10 of the related art or charges the battery 10 of the related art is not provided, a driving output of the driving body 20 which is connected to the battery 10 of the related art is also lowered.

In contrast, a battery management apparatus 100 according to an exemplary embodiment of the present invention is formed such that a first battery 110 and a second battery 120 are connected to each other. Therefore, even when an output of the first battery 110 is lowered, power may be supplemented by the second battery 120 or the driving body 20 may be directly driven using the second battery 120.

Further, when a volume of the battery 10 of the related art is compared with a volume of the battery management apparatus 100 according to the exemplary embodiment of the present invention, the overall volume of the battery management apparatus 100 is equal to the volume of the battery 10, but the battery management apparatus 100 is divided into two batteries to be attached by removing the battery 10 of the related art from the electric vehicle of the related art so that the battery management apparatus 100 may be used in the electric vehicle as it is without separately forming a holding space.

A configuration of the battery management apparatus 100 will be described in more detail with reference to FIG. 2.

Figure 2:
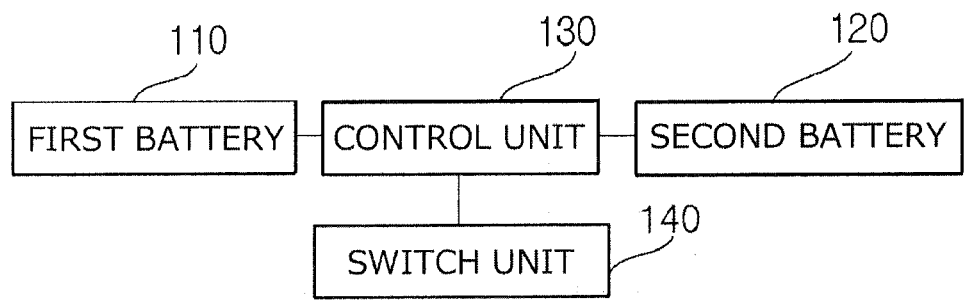
FIG. 2 is a block diagram specifically illustrating a configuration of a battery management apparatus 100 according to an exemplary embodiment of the present invention.

FIG. 2 is a block diagram specifically illustrating a configuration of a battery management apparatus 100 according to an exemplary embodiment of the present invention.

Referring to FIG. 2, the battery management apparatus 100 according to the exemplary embodiment of the present invention includes a first battery 110, a second battery 120, and a control unit 130.

First, the first battery 110 is connected to the driving body 20 which is supplied with power to be driven and serves to supply power to allow the driving body to be driven.

Here, the driving body 20 may refer to any electric product which operates using power and for example, may include an electromotive motor.

The electromotive motor is supplied with power to rotate a rotating body provided inside to consume power and also generate another kinetic energy using a rotating body which rotates.

In the meantime, when the power which is supplied to the driving body 20 from the first battery 110 is lowered, an output of the driving body 20 may be also lowered. Therefore, in order to prevent the driving body 20 from erroneously operating due to insufficiently supplied power, the first and second batteries 110 and 120 and the control unit 130 operate so as to be complementary to each other.

An energy density of the first battery 110 which performs the above-mentioned function may be lower than an energy density of the second battery 120 which will be described below, which may be influenced by the type of battery corresponding to the first battery 110.

The first battery 110 may be one or more of a lithium ion (Li-ion) battery, a nickel-metal hydride (Ni-MH) battery, and a metal air battery.

The first battery 110 may be connected to the second battery 120 and the control unit 130 which will be described below and may be formed to be charged through the second battery 120 and output power of the first battery 110 may be controlled by the control unit 130, which will be described in more detail with reference to FIGS. 3 to 5 below.

In the meantime, it should be noted that as long as the first battery 110 performs the above-mentioned function (a function of supplying power to drive the driving body 20), the type, output power, and a capacity of the first battery 110 are not restricted.

Next, the second battery 120 may be connected to the above-described first battery 110 to supply power to the first battery 110 or charge the first battery 110 or may be directly connected to the driving body 20 to supply the power to drive the driving body 20.

Further, when power which is supplied to the driving body 20 is lowered, since an output of the driving body 20 may be also lowered, in order to prevent the driving body 20 from erroneously operating due to insufficiently supplied power, similarly to the first battery 110, the second battery 120 which performs the above-mentioned functions and the control unit 130 operate so as to be complementary to each other.

An energy density of the second battery 120 may be higher than the energy density of the first battery 110, for example, 250 Wh/kg or higher, which may be influenced by the type of battery corresponding to the second battery 120.

The second battery 120 may be one or more of a lithium (Li) battery, a lithium sulfur (Li—S) battery, a metal air battery, and an all solid state battery.

Further, the second battery 120 is configured as a rechargeable battery so that even when all the second batteries 120 are discharged, the secondary battery 120 does not need to be replaced but may be charged to be used again.

Further, the second battery 120 may have a higher capacity than that of the first battery 110. Therefore, when the second battery 120 is configured to have a high capacity, the battery management apparatus 100 may drive the driving body 20 for a longer time than the battery 10 of the related art. Furthermore, the second battery 120 is configured by a battery which has a lower output density than that of the first battery 110 and is cheaper than the first battery 110 so that the battery management apparatus 100 according to the exemplary embodiment of the present invention may implement the battery 10 which is driven for a long time at low cost.

Further, the second battery 120 performs a function to charge the first battery 110, which may prevent an erroneous operation of the driving body 20 which is caused when the output of the first battery 110 is lowered, which will be described in more detail with reference to FIGS. 3 to 5 below.

In the meantime, it should be noted that as long as the second battery 120 performs the above-mentioned function (a function of supplying power to drive the driving body 20 or charging the first battery 110), the type, output power, and a capacity of the second battery 120 are not restricted.

Finally, the control unit 130 may control electric energy of the power which is supplied from the above-described first battery 110 and second battery 120 to the driving body 20.

That is, the control unit 130 may correspond to a battery management system (BMS) which controls a battery which is provided in an electric vehicle and controls the electric energy of the first battery 110 and the second battery 120 by three methods, which will be described in more detail with reference to FIGS. 3 to 5.

Figure 3:
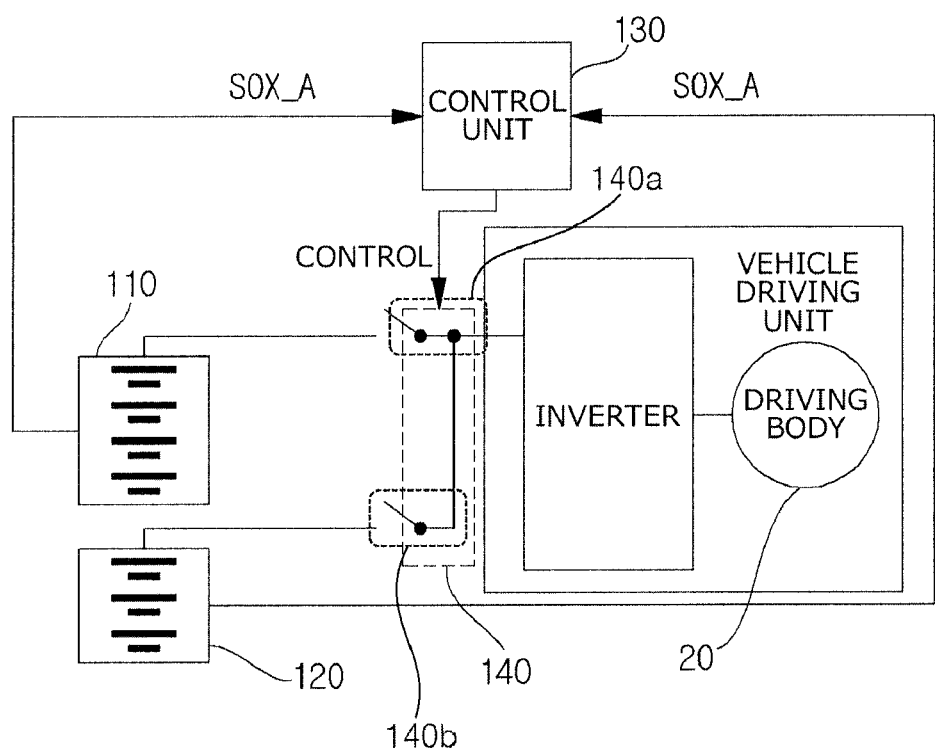
FIG. 3 is a view illustrating a circuit diagram of a battery management apparatus 100 according to an exemplary embodiment of the present invention.
Figure 4:
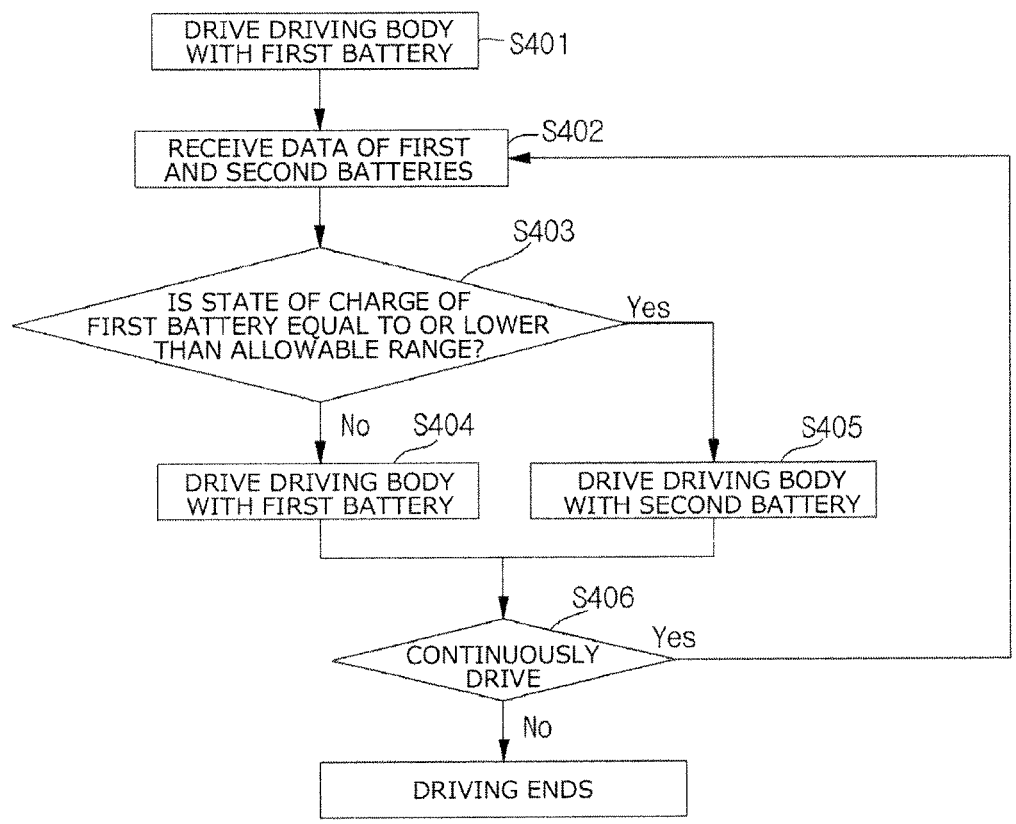
FIG. 4 is a flow chart illustrating an operation of the battery management apparatus 100 illustrated in FIG. 3.
Figure 5:
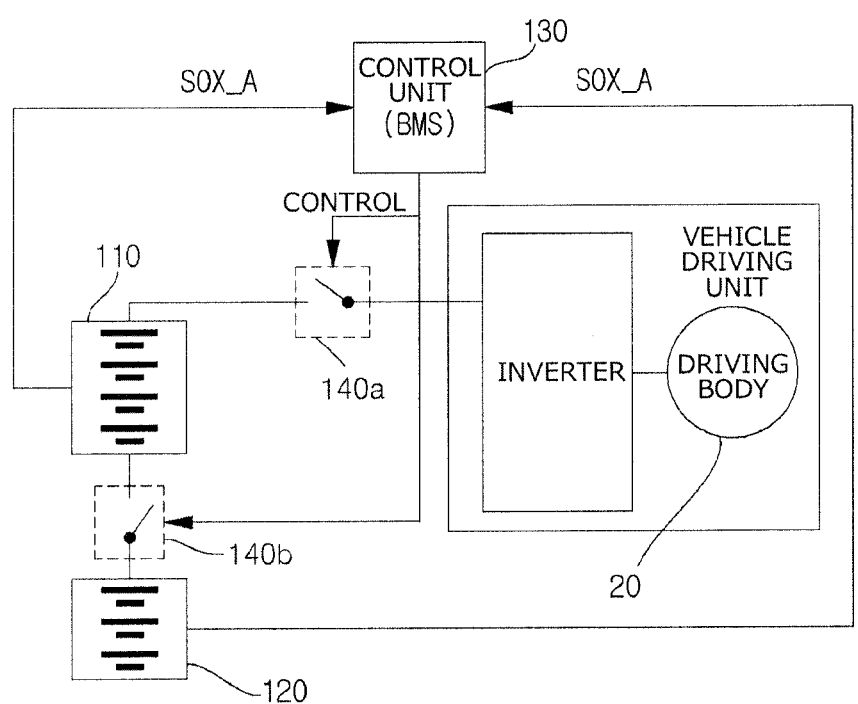
FIG. 5 is a view illustrating a circuit diagram of a battery management apparatus 100' according to another exemplary embodiment of the present invention.
Figure 6:
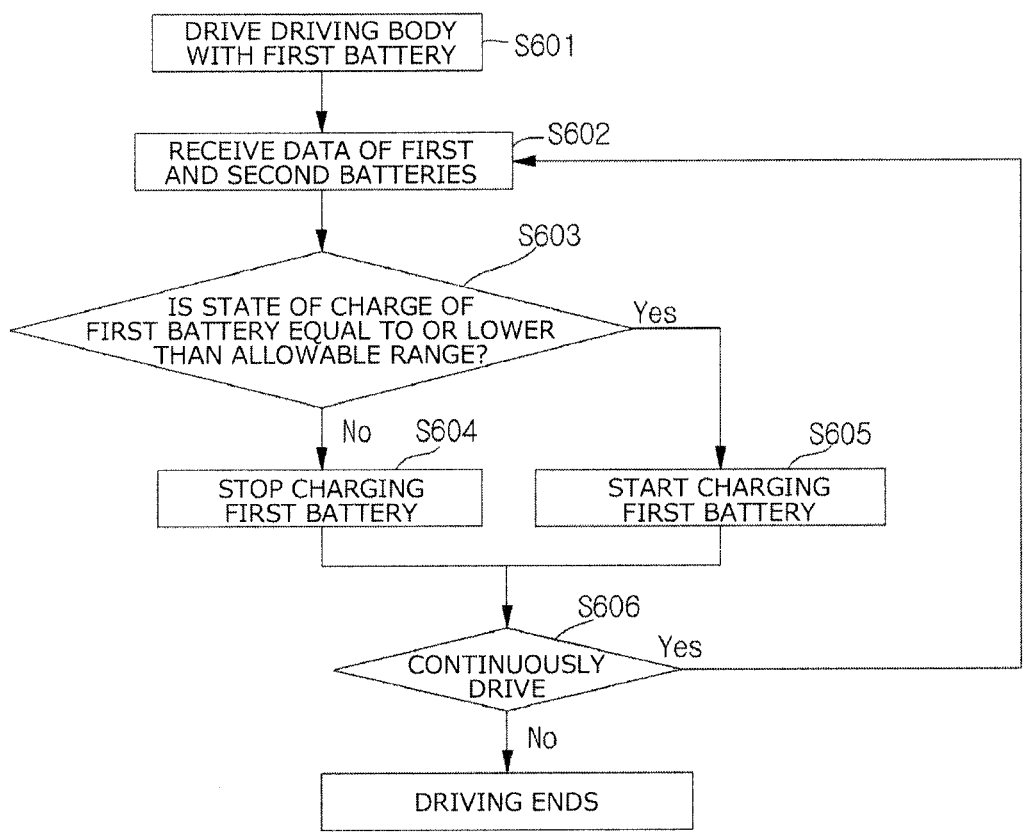
FIG. 6 is a flow chart illustrating an operation of the battery management apparatus 100' illustrated in FIG. 5.
Figure 7:
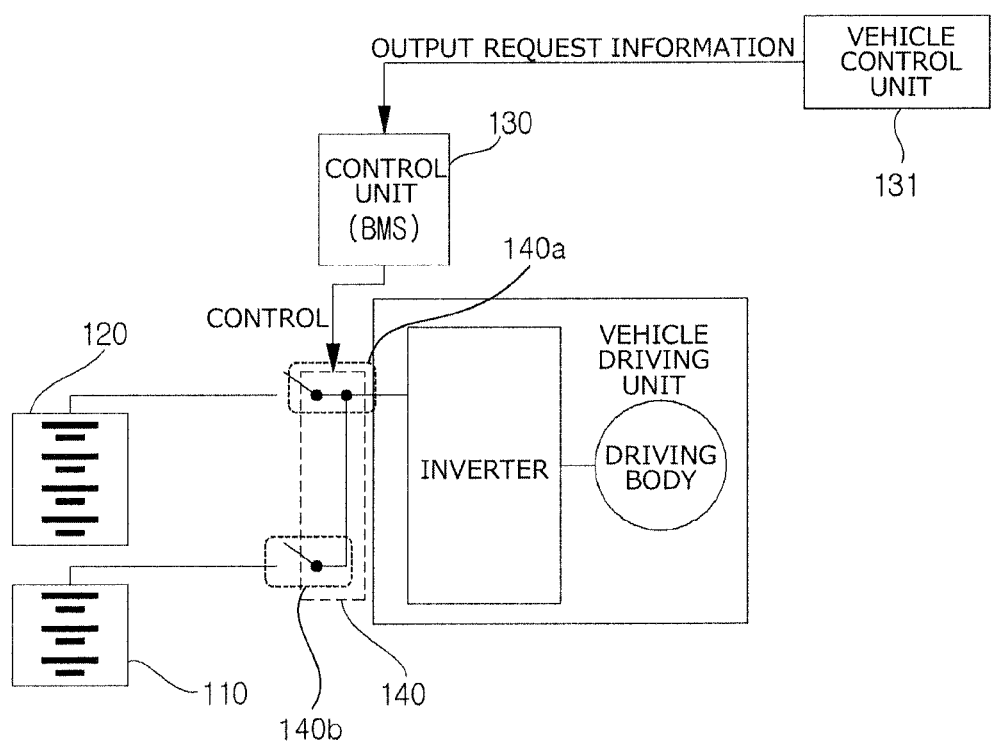
FIG. 7 is a view illustrating a circuit diagram of a battery management apparatus 100" according to another exemplary embodiment of the present invention.
Figure 8:
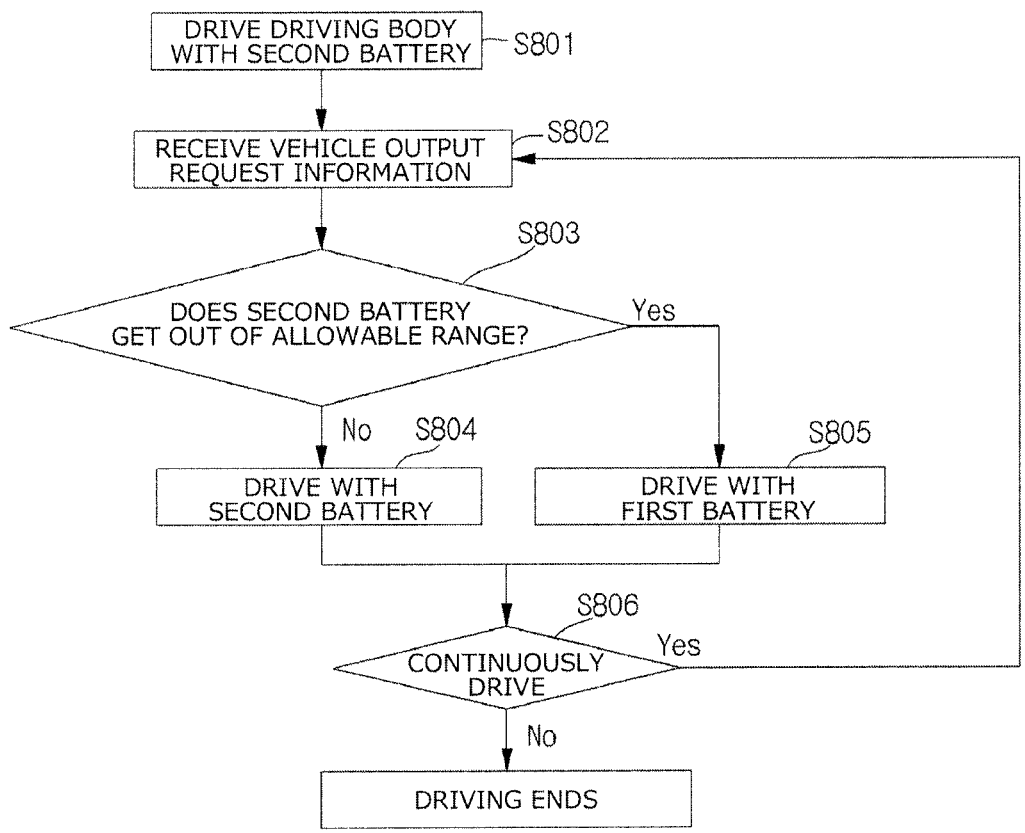
FIG. 8 is a flow chart illustrating an operation of the battery management apparatus 100" illustrated in FIG. 7.

FIG. 3 is a view illustrating a circuit diagram of a battery management apparatus 100 according to an exemplary embodiment of the present invention, FIG. 4 is a flow chart illustrating an operation of the battery management apparatus 100 illustrated in FIG. 3, FIG. 5 is a view illustrating a circuit diagram of a battery management apparatus 100' according to another exemplary embodiment of the present invention, FIG. 6 is a flow chart illustrating an operation of the battery management apparatus 100' illustrated in FIG. 5, FIG. 7 is a view illustrating a circuit diagram of a battery management apparatus 100" according to another exemplary embodiment of the present invention, and FIG. 8 is a flow chart illustrating an operation of the battery management apparatus 100" illustrated in FIG. 7.

First, referring to FIG. 3, first and second batteries 110 and 120 are connected to a driving body 20, respectively, and a switch unit 140 is connected between connection terminals.

Here, the switch unit 140 is also connected to the control unit 130 so as to be controlled by the control unit 130 to individually shut off and supply the power of the first and second batteries 110 and 120.

The switch unit 140 may include a first switch unit 140a which is connected to the first battery 110 and a second switch unit 140b which is connected to the second battery 120 and when the first switch unit 140a and the second switch unit 140b are turned on, the first and second batteries 110 and 120 are electrically conducted with the driving body 20 and thus the driving body 20 is driven.

In contrast, when the first and second switch units 140a and 140b are turned off, the first and second batteries 110 and 120 are disconnected from the driving body 20 and thus the driving of the driving body 20 stops.

Further, the first and second batteries 110 and 120 are connected to the control unit 130 so that the control unit 130 receives a state of charge (SOC) which is transmitted from the first and second batteries 110 and 120 and controls the power which is supplied to the driving body 20 based on the SOC.

That is, a state of charge of the first battery 110 is equal to or lower than a predetermined state of charge, the control unit 130 controls the power of the second battery 120 so as to drive the driving body 20 by the power of the second battery 120.

Here, when the state of charge of the first battery 110 is equal to or lower than the predetermined state of charge, the driving body 20 may erroneously operate while the output of the driving body 20 is lowered.

Referring to FIG. 4, first, the driving body 20 receives the power from the first battery 110 to start to be driven in step S401. Next, the control unit 130 receives data on a state of charge (SOC) from the first and second batteries 110 and 120 in step S402. Next, the control unit 130 compares the state of charge of the first battery 110 with a basic state of charge which is required to drive the driving body 20 based on the received state of charge in step S403. In this case, when the state of charge of the first battery 110 exceeds the predetermined state of charge, the control unit 130 controls the first battery 110 so as to continuously drive the driving body 20 through the power of the first battery 110 and turns off the second switch unit 140b which is connected to the second battery 120 so as not to operate the second battery 120 in step S404.

When the state of charge of the first battery 110 is equal to or lower than the predetermined state of charge, the control unit 130 turns off the first switch unit 140a which is connected to the first battery 110 to stop operation of the first battery 110 and turns on the second switch unit 140b which is connected to the second battery 110 to control the second battery 120 so as to drive the driving body 20 through the power of the second battery 120 in step S405.

When the driving body 20 is continuously driven, the control unit 130 receives driving data from the driving body 20 in step S406 and repeatedly performs a control operation of the first and second batteries 110 and 120 based on the driving data.

Next, a battery management apparatus 100' according to another exemplary embodiment of the present invention will be described with reference to FIG. 5. A first battery 110 is connected to a driving body 20 through a first switch unit 140a' and the first battery 110 and a second battery 120 are connected to each other through a second switch unit 140b'.

Therefore, the second battery 120 may be connected to or disconnected from the first battery 110 in accordance with an on/off state of the second switch unit 140b'.

Further, the first and second batteries 110 and 120 are connected to the control unit 130, which is the same as the above description of FIG. 3 and a detailed description thereof will be omitted.

In the meantime, both the first switch unit 140a' between the first battery 110 and the driving body 20 and the second switch unit 140b' between the first battery 110 and the second battery 120 are connected to the control unit 130 so as to be controlled by the control unit 130.

The control unit 130 receives data on a state of charge from the first and second batteries 110 and 120 and controls power to be supplied to the driving body 20 in accordance with the state of charge.

That is, when the state of charge of the first battery 110 is equal to or lower than a predetermined state of charge, the control unit 130 charges the first battery 110 by the power of the second battery 120.

Referring to FIG. 6, first, the driving body 20 receives power from the first battery 110 to start to be driven in step S601. Next, the control unit 130 receives data on a state of charge (SOC) from the first and second batteries 110 and 120 in step S602. Next, the control unit 130 compares the state of charge of the first battery 110 with a basic state of charge which is required to drive the driving body 20 based on the received state of charge in step S603. In this case, when the state of charge of the first battery 110 exceeds the predetermined state of charge, the control unit 130 controls the first battery 110 so as to continuously drive the driving body 20 through the power of the first battery 110 and turns off the second switch unit 140b' which is connected to the second battery 120 so as not to charge the first battery 110 by the second battery 120 in step S604.

When the state of charge of the first battery 110 is equal to or lower than the predetermined state of charge, the control unit 130 turns on the second switch unit 140b' which is connected to the second battery 120 to charge the first battery 110 through the power of the second battery 120 in step S605. Accordingly, the first battery 110 receives power from the second battery 120 so that the driving body 20 is continuously normally driven.

Further, when the driving body 20 is continuously driven, the control unit 130 receives driving data from the driving body 20 in step S606 and repeatedly performs a control operation of the first and second batteries 110 and 120 based on the driving data.

Next, a battery management apparatus 100' according to another exemplary embodiment of the present invention will be described with reference to FIG. 7. The battery management apparatus 100' is formed to have the same technical configuration as the battery management apparatus 100 illustrated in FIG. 3 so that a control unit 130 which is differently formed will be mainly described.

The control unit 130 may be connected to a vehicle control unit 131 and the vehicle control unit 131 provides output request information to the control unit 130 and the control unit 130 controls first and second batteries 110 and 120 based on the output request information.

In this case, when an output amount of the second battery 120 gets out of a predetermined allowable output range, the control unit 130 stops supplying the power of the second battery 120 and drives the driving body 20 through the power of the first battery 110.

Here, when the output amount of the second battery 120 gets out of the predetermined allowable output range, the output amount of the second battery 120 is unstable so that the output amount may be high or low. Therefore, the output amount of the second battery 120 may be below the predetermined allowable output range or the output amount of the second battery 120 may be significantly out of the predetermined allowable output range.

Therefore, when the output amount of the second battery 120 gets out of the predetermined allowable output range, it may be understood that the output amount of the second battery 120 does not reach the predetermined allowable output range or significantly exceeds the predetermined allowable output range.

Referring to FIG. 8, first, the driving body 20 receives the power from the second battery 120 to start to be driven in step S801. Next, the control unit 130 receives data on output amounts from the first and second batteries 110 and 120 in step S802. Next, the control unit 130 compares the output amount of the second battery 120 with a basic output amount which is required to drive the driving body 20 based on the received output amount in step S803. In this case, when the output amount of the second battery 120 does not get out of the predetermined allowable output range, the control unit 130 controls the second battery 120 so as to continuously drive the driving body 20 through the power of the second battery 120 and turns off the second switch unit 140*b*" which is connected to the first battery 110 so as not to operate the first battery 110 in step S804.

When the output amount of the second battery 120 gets out of the predetermined allowable output range, the control unit 130 turns off the first switch unit 140*a*" which is connected to the second battery 120 to stop the operation and turns on the second switch unit 140*b*" which is connected to the first battery 110 to control the first battery 110 so as to drive the driving body 20 through the power of the first battery 110 in step S805.

When the driving body 20 is continuously driven, the control unit 130 receives driving data from the driving body 20 in step S806 and repeatedly performs a control operation of the first and second batteries 110 and 120 based on the driving data.

Next, driving efficiency of a vehicle by the battery management apparatus 100 according to the exemplary embodiment of the present invention will be described.

In one embodiment, a lithium ion battery of a vehicle in which a lithium-ion battery of the related art is installed has a total weight of 300 kg, an output amount of 24 kWh, and an energy density per weight of 140 Wh/kg and the vehicle drives a distance of 160 km at most.

In this case, $750 are required to output an output amount of 1 kWh and $18,000 are spent at most to drive the total driving distance of 160 km.

That is, when only the lithium-ion battery of the related art is used, there are problems in that the driving distance is short and consumed cost is large.

The first battery 110 of a vehicle in which the first and second batteries 110 and 120 of the battery management apparatus 100 according to the exemplary embodiment of the present invention are installed may have a weight of 200 kg, an output amount of 16 kWh, and an energy density per weight of 140 Wh/kg. Further, the second battery 120 may have a weight of 100 kg, an output amount of 29 kWh, and an energy density per weight of 500 Wh/kg.

Therefore, a total weight of the first and second batteries 110 and 120 is 300 kg, which is the same weight as the lithium-ion battery of the related art.

Further, the vehicle may drive a distance of 297 km at most. In this case, $333 are required to output an output amount of 1 kWh and thus at most $14,857 are spent to drive the total driving distance of 297 km.

That is, it is known that the driving distance when the first and second batteries 110 and 120 according to the exemplary embodiment of the present invention are used is drastically increased as compared with the lithium-ion battery of the related art and 20% or more of the cost is reduced.

The second battery 120 of a vehicle in which the second battery 120 of the battery management apparatus 100 according to another exemplary embodiment of the present invention is installed may have a weight of 300 kg, an output amount of 86 kWh, and an energy density per weight of 500 Wh/kg.

Therefore, a total weight of the second battery 120 is 300 kg, which is the same weight as the lithium-ion battery of the related art.

Further, the vehicle may drive a distance of 500 km or more at most. In this case, $100 are required to output an output amount of 1 kWh and thus at most $8,600 are spent to drive the total driving distance of 500 km.

That is, it is known that the driving distance when the battery management apparatus 100 according to the exemplary embodiment of the present invention is used is drastically increased as compared with the lithium-ion battery of the related art and 50% or more of the cost is reduced.

While the invention has been shown and described with respect to the preferred embodiments, it will be understood by those skilled in the art that various changes and modifications may be made without departing from the spirit and scope of the invention as defined in the following claims.

The invention claimed is:

1. A battery management apparatus, comprising:
    a first battery which is connected to a driving body which is supplied with power to be driven and supplies power to drive the driving body;
    a second battery which is connected to the first battery to supply power to charge the first battery or is connected to the driving body to supply power to drive the driving body;
    a control unit which controls electric energy which is supplied between the first and second batteries in accordance with states of the first and second batteries, the control unit measuring the output amount of the second battery; and
    a switch unit which is controlled by the control unit and connects the first and second batteries and the control unit with each other,
    wherein, when the output amount of the second battery measured by the control unit exceeds a predetermined fixed allowable output range, the control unit controls to drive the driving body through the first battery and the switch unit electrically disconnects the second battery from the driving body,
    wherein, when the output amount of the second battery measured by the control unit does not reach the predetermined allowable output range, the control unit controls to drive the driving body through the first battery and the switch unit electrically disconnects the second battery from the driving body, and
    wherein a power density of the second battery is lower than a power density of the first battery.

2. The battery management apparatus of claim 1, wherein an energy density of the first battery is lower than an energy density of the second battery.

3. The battery management apparatus of claim 2, wherein the first battery is one or more of a lithium ion (Li-ion) battery, a nickel-metal hydride (Ni-MH) battery, and a metal air battery.

4. The battery management apparatus of claim 1, wherein a capacity of the second battery is larger than a capacity of the first battery.

5. The battery management apparatus of claim 1, wherein the second battery is one or more of a lithium (Li) battery, a lithium sulfur (Li—S) battery, a metal air battery, and an all solid state battery.

6. The battery management apparatus of claim 1, wherein when a state of charge of the first battery is equal to or lower than a predetermined state of charge and the output amount of the second battery measured by the control unit is within the predetermined allowable output range, the control unit controls to supply the power of the second battery so as to drive the driving body through the power of the second battery.

7. The battery management apparatus of claim 6, wherein the switch unit includes first and second switch units which are connected to the driving unit, and the control unit turns off the first switch unit and turns on the second switch unit when the state of charge of the first battery is equal to or lower than the predetermined state of charge and turns off the second switch unit when the state of charge of the first battery exceeds the predetermined state of charge.

8. The battery management apparatus of claim 1, wherein when a state of charge of the first battery is equal to or lower than a predetermined state of charge and the output amount of the second battery measured by the control unit is within the predetermined allowable output range, the control unit controls the power of the second battery so as to charge the first battery by the second battery.

9. The battery management apparatus of claim 8, wherein the switch unit includes:

a first switch unit which is provided between the driving body and the first battery; and a second switch unit which is provided between the first and second batteries, when the state of charge of the first battery is equal to or lower than the predetermined state of charge, the control unit turns on the second switch unit to charge the first battery through the power of the second battery and when the state of charge of the first battery exceeds the predetermined state of charge, the control unit turns off the second switch unit so as not to supply the power of the second battery to the first battery.

10. The battery management apparatus of claim 1, wherein the switch unit includes:

first and second switch units which are connected to the driving unit, when the output amount of the second battery does not get out of the predetermined allowable output range, the control unit turns off the second switch unit which is connected to the first battery, and when the output amount of the second battery gets out of the predetermined allowable output range, the control unit turns off the first switch unit which is connected to the second battery and turns on the second switch unit which is connected to the first battery to drive the driving body through the power of the first battery.

11. A battery management method, comprising:

connecting a driving body which is supplied with power to be driven and a first battery which supplies the power to drive the driving body;

supplying power to charge the first battery or connecting a second battery which supplies power to drive the driving body with the first battery or the driving body;

connecting a control unit which controls an electric energy which is supplied between the first and second batteries according to states of the first and second batteries with the first and second batteries through a switch unit; and controlling of power to be supplied to the driving body, and wherein the controlling of power to be supplied to the driving body includes:

measuring the output amount of the second battery;

controlling to supply power of the first battery so as to drive the driving body through the power of the first battery and electrically disconnecting the second battery from the driving body when the measured output amount of the second battery exceeds a predetermined fixed allowable output range, and to supply power of the first battery so as to drive the driving body through the power of the first battery and electrically disconnecting the second battery from the driving body when the measured output amount of the second battery does not reach the predetermined allowable output range, wherein a power density of the second battery is lower than a power density of the first battery.

12. The battery management method of claim 11, wherein the controlling of power to be supplied to the driving body further includes:

calculating, by the control unit, a state of charge (SOC) of the first battery; and comparing, by the control unit, a predetermined state of charge with the state of charge of the first battery to control the power to be supplied to the driving body.

13. The battery management method of claim 12, wherein the controlling of power to be supplied to the driving body includes:

controlling, by the control unit, the switch unit to drive the driving body through the power of the second battery to control to supply the power of the second battery, when the state of charge of the first battery is equal to or lower than the predetermined state of charge and the output amount of the second battery measured by the control unit is within the predetermined allowable output range.

14. The battery management method of claim 13, wherein the controlling of supplying power of the second battery, includes:

connecting first and second switch units, which are connected to the driving body, with the first and second batteries, respectively; and turning off the first switch unit and turning on the second switch unit when the state of charge of the first battery is equal to or lower than the predetermined state of charge and turning off the second switch unit when the state of charge of the first battery exceeds the predetermined state of charge, by the control unit.

15. The battery management method of claim 12, wherein the controlling of power to be supplied to the driving body includes: controlling power of the second battery so as to charge the first battery by the second battery when a state of charge of the first battery is equal to or lower than a predetermined state of charge and the output amount of the second battery measured by the control unit is within the predetermined allowable output range.

16. The battery management method of claim 15, wherein the controlling of power of the second battery, includes:
- providing a first switch unit between the driving body and the first battery to be connected to each other;
- providing a second switch unit between the first battery and the second battery to be connected to each other; and
- turning on the second switch unit to charge the first battery through power of the second battery when the state of charge of the first battery is equal to or lower than the predetermined state of charge and turning off the second switch unit so as not to supply the power of the second battery to the first battery when the state of charge of the first battery exceeds the predetermined state of charge, by the control unit.

17. The battery management method of claim 12, wherein the controlling of supplying power of the first battery, includes:
- connecting first and second switch units, which are connected to the driving body, with the second and first batteries, respectively; and
- turning off the second switch unit which is connected to the first battery when the output amount of the second battery does not get out of the predetermined allowable output range, turning off the first switch unit which is connected to the second battery and turning on the second switch unit which is connected to the first battery to drive the driving body through the power of the first battery when the output amount of the second battery gets out of the predetermined allowable output range, by the control unit.

\* \* \* \* \*